United States Patent
Mizuno

(10) Patent No.: US 8,285,080 B2
(45) Date of Patent: Oct. 9, 2012

(54) IMAGE PROCESSING APPARATUS AND IMAGE PROCESSING METHOD

(75) Inventor: Yoshitake Mizuno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 12/496,608

(22) Filed: Jul. 1, 2009

(65) Prior Publication Data

US 2010/0008580 A1  Jan. 14, 2010

(30) Foreign Application Priority Data

Jul. 9, 2008  (JP) .................................. 2008-179463

(51) Int. Cl.
*G06K 9/32* (2006.01)
*G06K 9/36* (2006.01)
*G06K 9/46* (2006.01)

(52) U.S. Cl. ........ 382/299; 382/298; 382/284; 382/280; 382/195

(58) Field of Classification Search .......... 382/298–299, 382/195, 284, 280
See application file for complete search history.

(56) References Cited

U.S. PATENT DOCUMENTS

| 7,409,106 | B2 * | 8/2008 | Aiso | 382/284 |
| 7,796,301 | B2 * | 9/2010 | Solecki | 358/3.01 |
| 7,809,155 | B2 * | 10/2010 | Nestares et al. | 382/100 |
| 7,957,610 | B2 * | 6/2011 | Toma et al. | 382/299 |
| 8,014,633 | B2 * | 9/2011 | Liu | 382/299 |
| 8,068,700 | B2 * | 11/2011 | Tsunekawa et al. | 382/299 |
| 2005/0157949 | A1 * | 7/2005 | Aiso et al. | 382/299 |
| 2007/0098301 | A1 * | 5/2007 | Rengakuji et al. | 382/300 |
| 2007/0263113 | A1 * | 11/2007 | Baek et al. | 348/340 |

FOREIGN PATENT DOCUMENTS

| JP | 2005-354124 | 12/2005 |
| JP | 2006-092450 | 4/2006 |

* cited by examiner

*Primary Examiner* — Bhavesh Mehta
*Assistant Examiner* — Utpal Shah
(74) *Attorney, Agent, or Firm* — Fitzpatrick, Cella, Harper & Scinto

(57) ABSTRACT

An image scanner using an area sensor having a tilt reads a plurality of low-resolution image data having phase shifts from each other, and the low-resolution image data are converted into those on an orthogonal coordinate system by affine transformation. The number of data to be used is decided based on one of these low-resolution image data. The low-resolution image data as many as the designated number of data are saved, and high-resolution image data is generated by executing super-resolution processing.

16 Claims, 16 Drawing Sheets

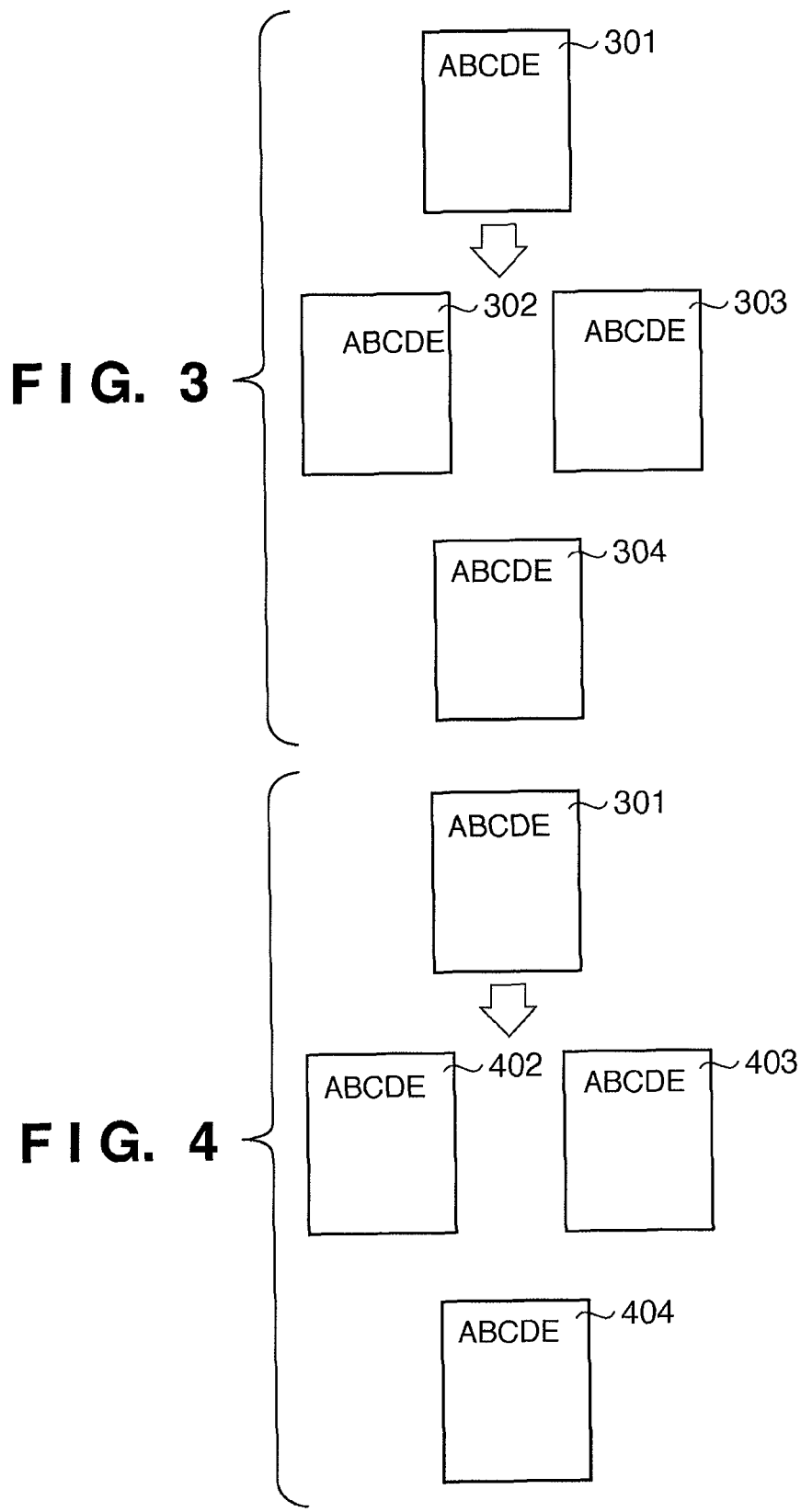

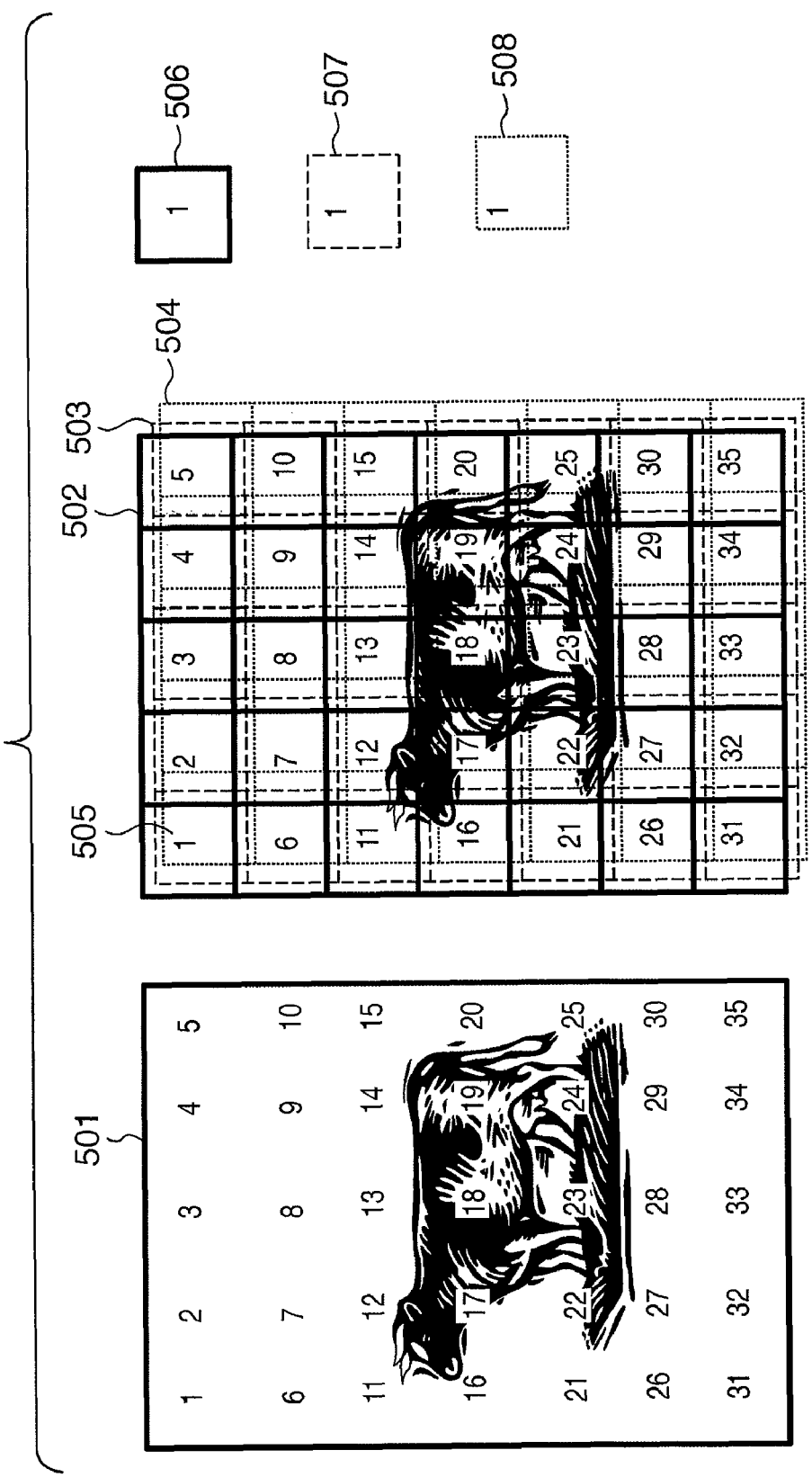

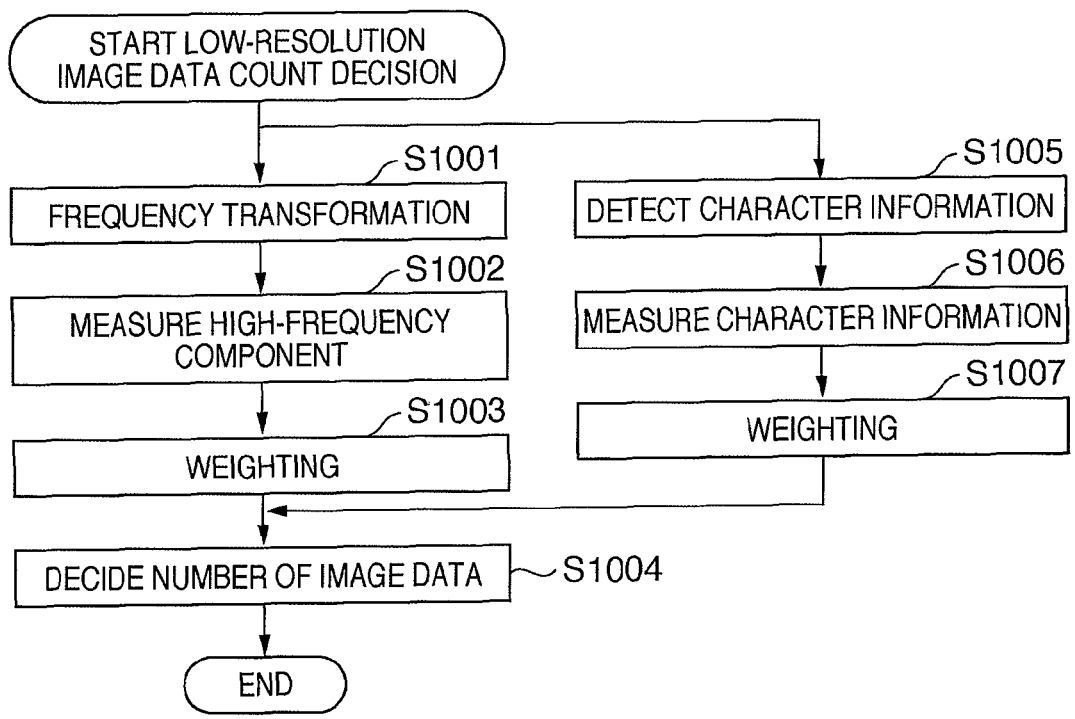

◇ PIXEL OF TARGET LOW-RESOLUTION IMAGE
● SUPER-RESOLUTION PROCESSING TARGET PIXEL

IMAGE PROCESSING APPARATUS AND IMAGE PROCESSING METHOD

BACKGROUND OF THE INVENTION

1. Field of the Invention

The present invention relates to an image processing apparatus, image processing method and a program, which execute copy processing and transmission processing using, for example, a scanner and, more particularly, to an image processing apparatus, image processing method and a program, which use a super-resolution technique.

2. Description of the Related Art

A technique called "super-resolution", which enhances a resolution using a plurality of images having a given resolution, is known. With this technique, an image of 600 dpi can be converted into an image of 1200 dpi or the equivalent, and a conventional device can be used to obtain an image having a higher resolution. In the present specification, when an image is converted into pixels, the number of pixels (i.e., a pixel density) per unit length or per unit area of that image is called a resolution of the image. In order to attain the super-resolution technique, since a plurality of images having different phases in sub-pixel units (a unit smaller than one pixel) is necessary, the super-resolution technique is prevalently applied in the field of moving image processing and the like.

However, since the super-resolution processing requires a plurality of images per pixel, the required memory size and calculation volume increase. Hence, a technique which specifies an area of interest from low-resolution input images and increases/decreases the number of images to be synthesized based on the area size, so as to reduce the calculation volume and memory size, has been proposed (for example, see Japanese Patent Laid-Open No. 2006-092450). Also, a technique which separates input images into emphasis areas and non-emphasis areas and sets the number of low-resolution images to be used for non-emphasis areas smaller than that for emphasis areas, so as to reduce the calculation volume and memory size, has been proposed (for example, see Japanese Patent Laid-Open No. 2005-354124).

In the aforementioned related arts, the user designates emphasis areas or emphasis areas are automatically decided from areas where luminance values are not different in a plurality of images, thus deciding the number of input images used in the super-resolution processing.

However, whether or not high-resolution processing is required for an input image of a multi-functional peripheral equipment (MFP) cannot be determined based only on the size of an area of interest and luminance difference. For this reason, low-resolution processing is often applied to an input image that requires high-resolution processing. For example, when a complicated image such as a map or an image of a brochure including many fine characters are input, they undergo low-resolution processing in the related art, and a problem of crushed small characters is posed even though it has been decided that luminance values are not different in a plurality of images.

When OCR processing is executed for an input image that has a low resolution, particularly, characters of small points are recognized as wrong characters or not recognized, resulting in low character recognition precision.

SUMMARY OF THE INVENTION

The present invention has been made in consideration of the aforementioned related arts, and has as its object to provide an image processing apparatus and image processing method, which can determine the necessity of high-resolution processing with high precision for input document data to avoid execution of super-resolution processing with low necessity and to adequately execute super-resolution processing with high necessity.

In order to achieve the above object, the present invention comprises the following arrangement. That is, an image processing apparatus, which is configured to execute super-resolution processing for generating high-resolution image data having a high resolution by synthesizing low-resolution image data, the apparatus comprises:

a decision unit configured to decide the number of low-resolution image data to be used in accordance with frequency characteristics included in the low-resolution image data; and a super-resolution processing unit configured to generate a high-resolution image by synthesizing low-resolution image data which are as many as the number of data decided by the decision unit, are obtained from an identical image, and have phase shifts from each other.

Alternatively, according to another aspect of the present invention, the present invention comprises the following arrangement. That is, an image processing apparatus, which is configured to execute super-resolution processing for generating high-resolution image data having a high resolution by synthesizing low-resolution image data, the apparatus comprises:

a decision unit configured to decide whether or not to execute super-resolution processing in accordance with frequency characteristics included in the low-resolution image data;

a super-resolution processing unit configured to generate a high-resolution image by synthesizing a plurality of low-resolution image data, which are obtained from an identical image and have phase shifts from each other, when the decision unit decides to execute the super-resolution processing; and an output unit configured to save or outputs the high-resolution image data generated by the super-resolution processing unit when the decision unit decides to execute the super-resolution processing, and saves or outputs the low-resolution image data when the decision unit decides not to execute the super-resolution processing.

According to the present invention, a performance drop and an increase in required memory size caused by super-resolution processing can be prevented. In addition, since super-resolution processing is applied to a high-resolution image, image processing that can assure high image quality can be implemented.

Further features of the present invention will become apparent from the following description of exemplary embodiments with reference to the attached drawings.

BRIEF DESCRIPTION OF THE DRAWINGS

FIG. 3 is a view showing image data obtained when a document image is captured using an obliquely attached sensor used in the embodiment of the present invention;

FIG. 4 is a view showing images after affine transformation of the captured image data;

FIG. 5 is a view showing images obtained when captured image data is segmented into blocks;

FIG. 10 is a flowchart showing the sequence of low-resolution image data count determination processing using the characteristics of frequency components and character information in the embodiment of the present invention;

FIG. 11 is a view showing a low-resolution image data count determination table in the embodiment of the present invention;

DESCRIPTION OF THE EMBODIMENTS

This embodiment will explain a method of generating a high-resolution image by acquiring a plurality of images having phase shifts and executing super-resolution processing taking, as an example of an image processing apparatus, a digital multi-functional peripheral equipment (MFP) which includes a scanner and printer, and has a copy function.

<Arrangement of Image Processing Apparatus>

Figure 1:
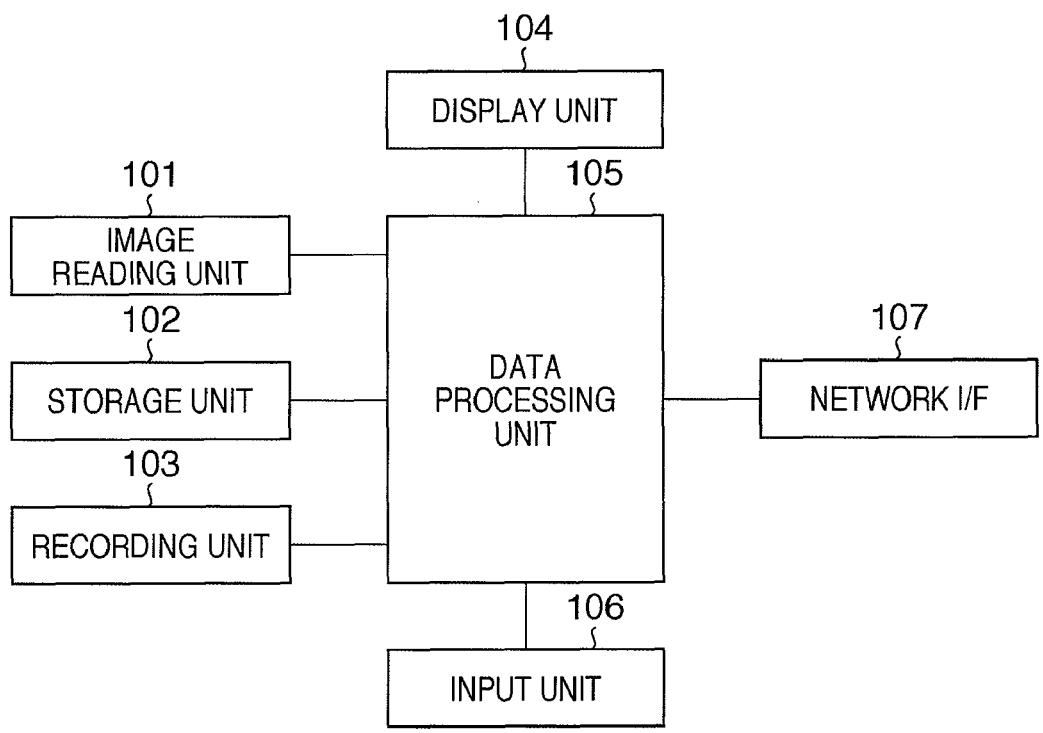
FIG. 1 is a block diagram showing the arrangement of an MFP used in an embodiment of the present invention.

FIG. 1 is a block diagram showing the arrangement of an MFP. An image reading unit 101 is an image scanner including an auto document feeder. A document surface of each of a bundle of documents or a document is irradiated with light coming from a light source (not shown), reflected image of a document is formed on a solid-state image sensing device such as a CCD sensor via a lens, and a raster image reading signal from the solid-state image sensing device is converted into a digital signal, thus obtaining digital image data. In an MFP with a color scanner, three different color filters are attached to the solid-state image sensing device to obtain an RGB color image. In this embodiment, an area sensor having a two-dimensional area is used as the CCD sensor. When the light source which irradiates a document with light scans the document in a predetermined direction, a reflected image of an irradiated part is formed on the image sensing device according to that scan. That is, a sub-scan is realized by movement of the light source, and the resolution in the sub-scan direction can be decided based on a moving speed of the light source and a sampling rate of the image sensing device. A one-way main scan is performed by sampling of the image sensing device for one line, and the resolution in the main scan direction can be decided by a reduction ratio of an optical system used to form a document image on the image sensing device and an element interval of an image sensing element group for one line.

Figure 16:
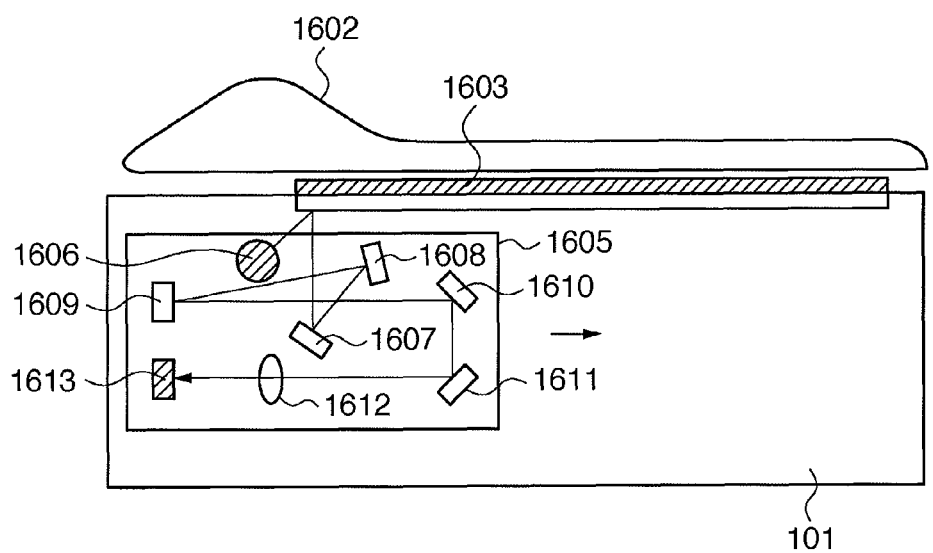
FIG. 16 is a sectional view of an image reading unit.

FIG. 16 shows the arrangement of the image reading unit 101. Referring to FIG. 16, an auto document feeder 1602 presses document image data against a platen glass 1604, and has an ADF function of feeding a document 1603 to a document reading position upon execution of a flow scan. The platen glass 1604 is a glass plate on which the document 1603 is placed upon reading a document on the platen glass. A reading unit 1605 includes a light source 1606 and a reading device (i.e., an image sensing device) used to read a document image on the document 1603, and moves in the sub-scan direction to scan the document 1603. The light source 1606 is a white light source such as a xenon tube, and irradiates a part to be read on the document 1603 with white light. Mirrors 1607 to 1611 have a role of guiding reflected light of light source light by the document to an image sensing device 1613. A lens 1612 is used to condense reflected light of document data reflected by the mirror 1611 onto the image sensing device 1613. The image sensing device 1613 is prepared by two-dimensionally laying out elements for outputting a formed document image as charges according to luminance levels. In this embodiment, the layout of the elements on the image sensing device 1613 is a grid-like layout in which one line has a length that can cover the maximum width of a readable document, and a plurality of such lines are arranged to have no pixel position differences. In this embodiment, the image sensing device is fixed to the reading unit 1605 to have a tilt through a minute angle so that each line is not perpendicular to the sub-scan direction.

A recording unit 103 is an electrophotographic or ink-jet printer. Upon execution of a copy function of the MFP, a data processing unit 105 processes image data read by the image reading unit 101, and outputs processed image data to the recording unit 103 to form an image on a medium such as a paper sheet. In this case, the data processing unit 105 applies image processing such as gamma processing, color space conversion processing, block selection processing, filter processing, compression processing, and halftone processing to data received from the image reading unit 101. The recording unit 103 forms and outputs an image based on the data processed by the data processing unit 105. Super-resolution processing as a characteristic feature of this embodiment is also executed by the data processing unit 105.

An operator inputs an instruction to the MFP using an input unit 106 as a key operation unit equipped on the MFP, and a series of operations are controlled by a controller (not shown) in the data processing unit 105.

On the other hand, a display unit 104 displays an operation input status, and image data which is being processed. A storage unit 102 is a storage area of an SDRAM, HDD, or the like, and can save image data captured by the image reading unit 101, high-resolution image data generated by super-resolution processing, and the like. When image data captured by the image reading unit 101 is to undergo super-resolution processing, the image data captured by the image reading unit 101 will be referred to as low-resolution image data hereinafter in contrast to high-resolution image data to be generated.

A network I/F 107 is an interface used to connect to a network. Using this interface, image data can be received from a computer (PC or the like), can be processed by the data processing unit 105, and can be printed by the recording unit 103. Also, data which is read by the image reading unit 101 and is processed by the data processing unit 105 can be transmitted to a PC or the like via the network I/F 107.

<Processing Sequence>

Figure 2:
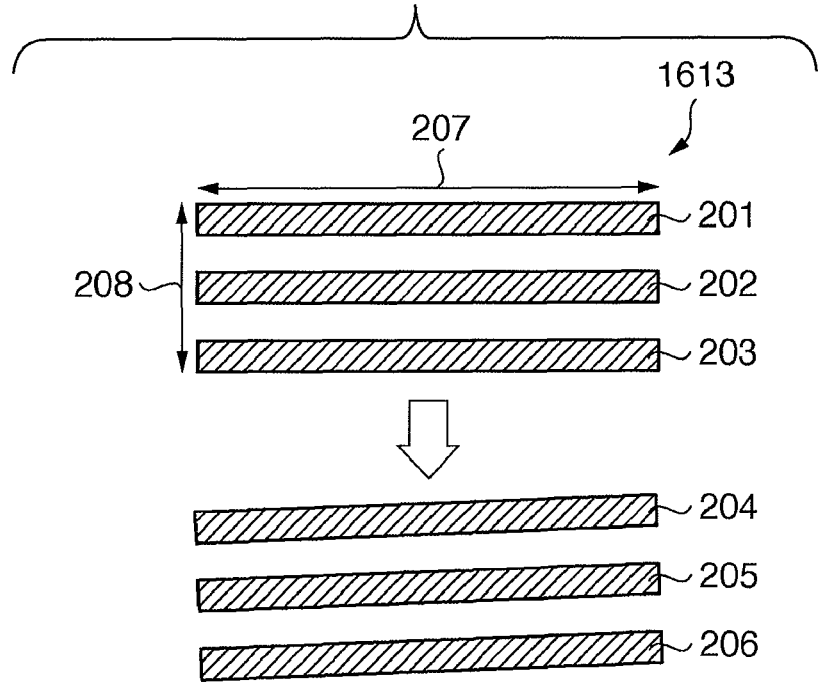
FIG. 2 is a view showing line sensors used in the embodiment of the present invention.

The sequence of processing of this embodiment will be described below. FIG. 2 is a view showing the solid-state image sensing device included in the image reading unit 101 used in the present invention. The image sensing device (image sensor) 1613 includes element arrays 201, 202, and 203, from each of which data for one line in the main scan direction can be obtained. An arrow 207 indicates the main scan direction, and an arrow 208 indicates the sub-scan direction. In a normal scanner, the image sensor is laid out so that each line is perpendicular to the sub-scan direction. By contrast, in this embodiment, the image sensor is laid out to have a slight tilt with respect to a normal layout. Lines 204, 205, and 206 indicate those of the obliquely attached image sensor. FIG. 3 shows examples obtained by scanning a document using this sensor. Image data 302 to 304 are examples of image data obtained by capturing a document 301 using the image sensor 1613. The image data 302 is an image captured by the sensor 204, the image data 303 is an image captured by the sensor 205, and the image data 304 is an image captured by the sensor 206. The image data 302 to 304 respectively have slight position shifts and tilts in the main scan direction and sub-scan direction with respect to the document image 301. Although images are exaggerated in FIG. 3 for the illustrative purpose, a shift amount is a sub-pixel size less than one pixel width in an actual apparatus. Also, the tilt is a minute tilt, that is, a shift between pixels located at the two ends of one line in the sub-scan direction is as small as about one pixel.

Figure 18:
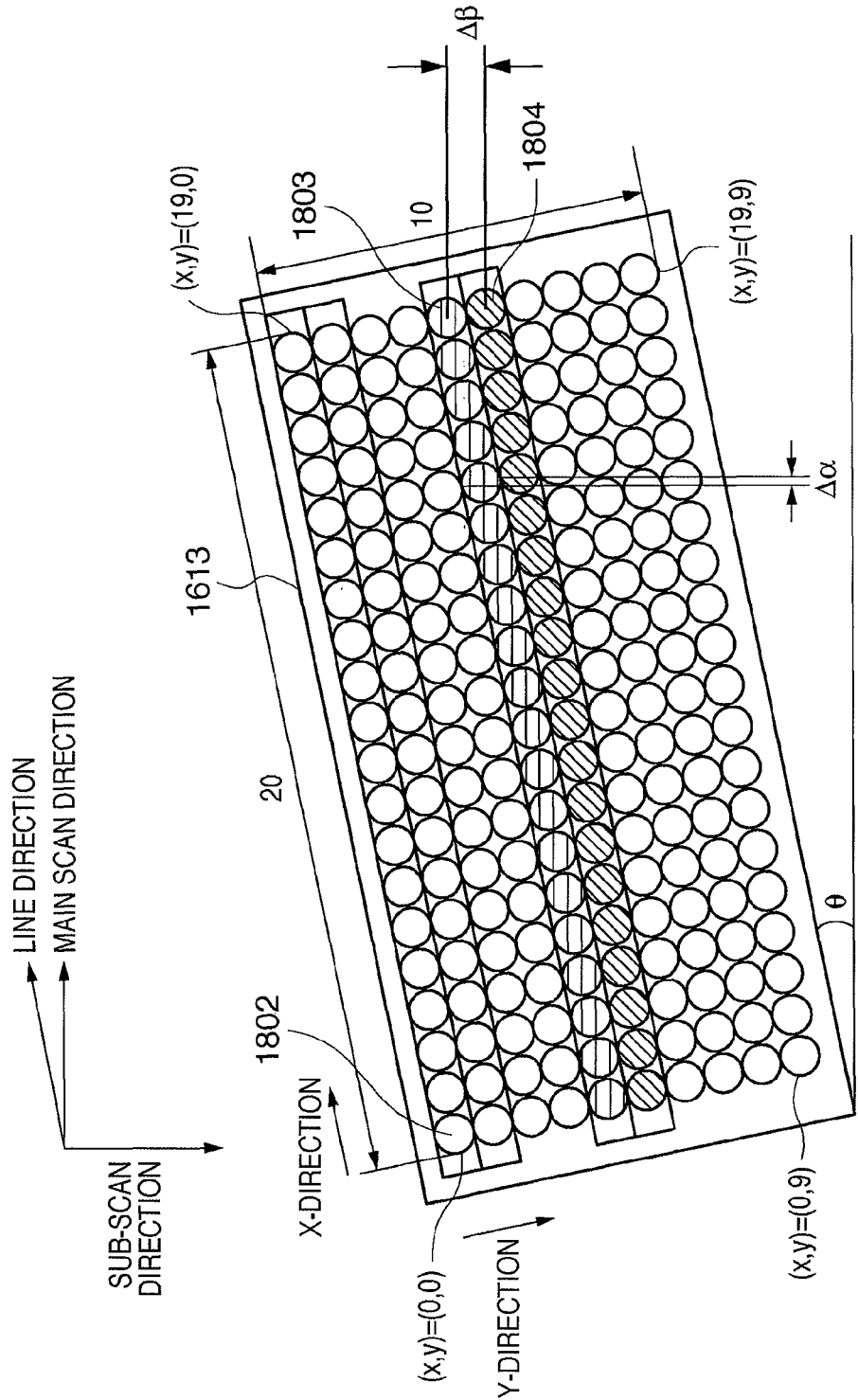
FIG. 18 is a view showing a layout example of an image sensing device.

FIG. 18 shows an example of the image sensing device 1613. FIG. 18 shows a sensor for 10 lines in place of three lines. For example, the sensor shown in FIG. 2 is obtained when three lines, that is, the uppermost and lowermost lines and their intermediate line, are used.

On the image sensing device 1613, in this embodiment, 20 pixels in the main scan direction and 10 pixels in the sub-scan direction are laid out in a grid pattern. The image sensing device 1613 is an area sensor having spreads in a line direction and a direction perpendicular to the line direction of the element arrangement. This area sensor is mounted to have a tilt with respect to a reference setting position. The reference setting position is a position where the image sensing device is arranged so that a line is perpendicular to the sub-scan direction in which a reflected image from a document moves. In a normal copying machine, scanner, or the like, the image sensing device 1613 is fixed at the reference setting position. In this case, pixel arrays read by respective lines directly form those on main scan lines. In this embodiment, the image sensing device is arranged to have an angle $\theta$ with respect to this reference setting position. That is, the sub-scan direction and line direction are perpendicular to each other at the reference position, while the sub-scan direction and line direction make an angle of $(90+\theta)°$ at the position shown in FIG. 18. In this case, a tilt of a line is corrected on image data to obtain image data in which pixels are laid out on an orthogonal coordinate system.

In FIG. 18, the position of each pixel of the image sensor 1613 is expressed to have an upper left end of the area sensor as an origin, the main scan direction as an x-direction, and the sub-scan direction as a y-direction. That is, the coordinates of the upper left end are $(x, y)=(0, 0)$, and those of the upper right end are $(x, y)=(19, 0)$. Likewise, the coordinates of the lower left end are $(x, y)=(0, 9)$, and those of the lower right end are $(x, y)=(19, 9)$.

A line 1803 indicates a group of pixel sensors for one line, which form the image sensor 1613. More specifically, the line 1803 includes 20 pixel sensors, which define the main scan direction. That is, the line 1803 includes pixel sensors at coordinate positions $(0, 4), (1, 4), (2, 4), \ldots, (19, 4)$. Note that a plurality of pixel sensors indicated by the line 1803 will be referred to as a "reading line sensor 1803" hereinafter. Likewise, a line 1804 includes pixel sensors at coordinate positions $(0, 5), (1, 5), (2, 5), \ldots, (19, 5)$, and will be referred to as a "reading line sensor 1804" hereinafter.

In this embodiment, by driving the reading unit 1605 including the image sensor 1613 mounted in the reading unit 101 in the directions of arrows shown in FIG. 16, a document image placed on the platen glass 1604 is read. That is, a reading operation is attained by handling the reading line sensors 1803 and 1804 as groups of pixel sensors as independent line sensors.

Image data read by the reading line sensors 1803 and 1804 will be explained below. Assume that an image to be read in this description is an alphabetic letter "A" which is written over a paper sheet. That is, this document image corresponds to an image written on the document 1603 in FIG. 16. Each grid shown in FIG. 16 corresponds to the resolution of a pixel sensor which forms the reading line sensor 1803 or 1804.

A document image is read by the image sensing device 1613. Since the image sensing device 1613 (i.e., line sensors) has a tilt through the angle $\theta$, image data in which each line has a tilt through the angle $\theta$ is obtained. The read image data is stored in a storage medium such as a memory intact.

Figure 19:
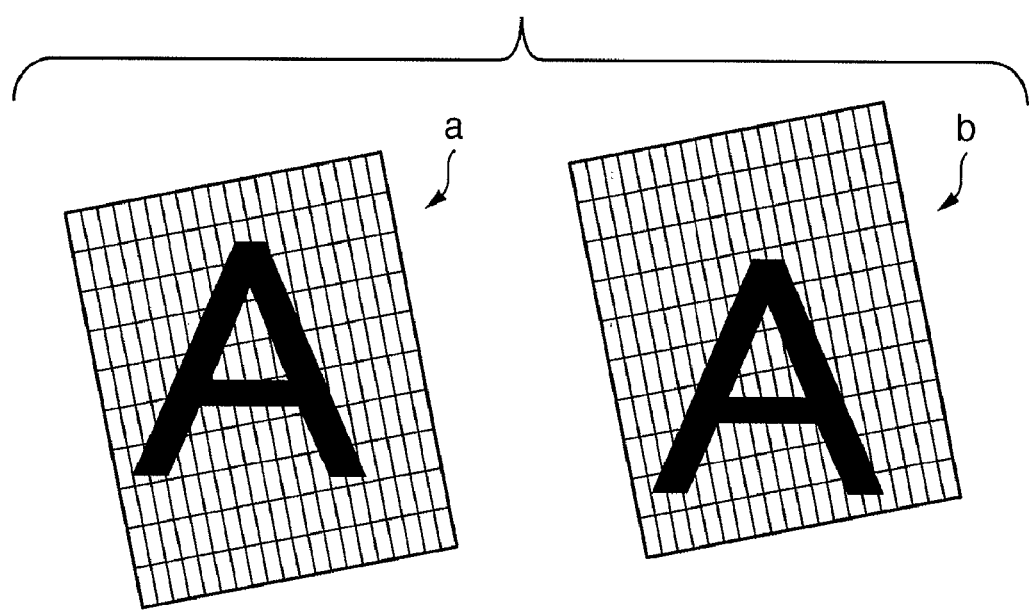
FIG. 19 is a view showing examples of low-resolution image data read by the image sensing device shown in FIG. 18.

Image data sensed and read by the respective line sensors of the image sensing device 1613 are those shown in FIG. 19, and are read as image data having a tilt through the angle $\theta$. FIG. 19 shows examples a and b of image data respectively read by the two different line sensors 1803 and 1804. As shown in FIG. 19, the reading line sensors 1803 and 1804 physically have a shift for one pixel in the sub-scan direction. Therefore, pixel sensors which form the reading line sensor 1803 and those which form the reading line sensor 1804 have phase shifts (or position shifts) in the horizontal and vertical directions. For example, a pixel sensor located at a coordinate position $(x, y)=(15, 4)$ of the reading line sensor 1803 and a pixel sensor located at a coordinate position $(x, y)=(15, 5)$ of the reading line sensor 1804 have a position shift y=one pixel in the y-direction. This shift brings about a shift of $\Delta\beta$ (pixel) <1 (pixel) in the sub-scan direction.

On the other hand, the positions of these pixel sensors in the x-direction are the same, that is, x=15. However, in the horizontal direction as a main scan direction before the entire area sensor is tilted, these positions have a phase shift by a minute amount $\Delta\alpha$ within a sub-pixel due to the presence of the tilt angle $\theta$. That is, even elements at the same position in the x-direction between the plurality of line sensors have a phase shift in a minute unit depending on the tilt angle in the main scan direction and sub-scan direction when the image sensing device 1613 has a tilt.

Therefore, image data which are read by the plurality of neighboring line sensors defined in the image sensing device 1613 have the same resolution, and a phase shift less than one pixel. More specifically, read image data a in FIG. 19 and read image data b in FIG. 19 have not only a shift $\Delta\beta$ in the sub-scan direction, but also a phase shift $\Delta\alpha$ in the main scan direction.

The above description has been given under the condition that there are two reading line sensors (reading line sensors 1803 and 1804) However, the present invention is not limited to this. By increasing pixel sensors which form the image sensing device 1613 in the x-direction, a larger number of reading line sensors may be formed. That is, the maximum number of reading line sensors equals the number of pixels which form the image sensing device 1613 in the x-direction. The number of reading line sensors is equal to the number of image data read by a single reading operation. More specifically, when the image sensing device 1613 includes reading line sensors for 30 lines, 30 read images having different phase shifts can be obtained by single reading control. Since the image sensing device 1613 has a tilt, image data for a plurality of images in which image data of the plurality of neighboring lines in the sub-scan direction corresponding to a document image have a shift less than one pixel in the main scan direction can be obtained by a single scan of the document image.

As described above, since the image sensing device 1613 has a tilt, and the line sensors are arranged at intervals, images having phase shifts in the main scan direction and sub-scan direction are obtained for respective channels, as indicated by the image data 302 to 304 in FIG. 3. If that phase shift is in a sub-pixel unit, super-resolution processing can be executed using the image data 302 to 304 to acquire a high-resolution image. By adjusting the intervals and angle of the sensors, a phase shift can be set to have a sub-pixel unit. Even when a phase shift exceeds one pixel, it is reduced to a sub-pixel shift by subtracting a shift in a pixel unit except for position shifts at the two ends of each line, and obtained images can be used in the super-resolution processing.

FIG. 4 shows examples of image data captured in FIG. 3 after affine transformation for correcting the tilt θ. In this embodiment, affine transformation is applied to the image data 302 to 304 obtained by capturing the document 301. Image data 402, 403, and 404 are those which are obtained by applying affine transformation to the image data 302, 303, and 304, respectively. By applying the affine transformation, a plurality of images, whose main scan line is horizontal to the document image (i.e., it is perpendicular to the sub-scan direction), and which have phase shifts for a sub-pixel in the main scan direction and sub-scan direction, can be acquired.

Figure 17:
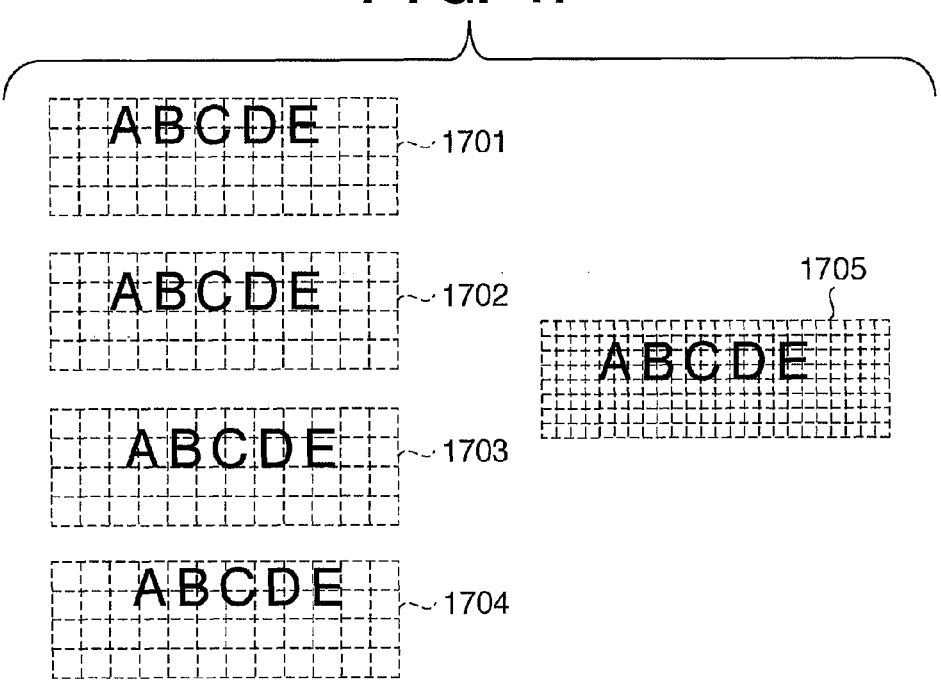
FIG. 17 is a view showing an example of super-resolution processing.

FIG. 17 shows examples of low-resolution image data obtained by this embodiment. Image data 1702 to 1704 are acquired to have phase shifts in the main scan direction and sub-scan direction. These image data correspond to the image data 402 to 404 in FIG. 4. FIG. 17 illustrates position shifts in an easy-to-understand manner by supplementarily displaying virtual grids. From these low-resolution image data, high-resolution image data 1705 is synthesized.

FIG. 5 shows an image obtained when each image data captured in FIG. 3 is segmented into blocks. An image 502 is obtained when a document image 501 is segmented into 35 blocks. At this time, images 503 and 504 have sub-pixel phase shifts from the image 502. A block 505 indicates a start block, that is, the first block of the image segmented into 35 blocks. Reference numeral 506 denotes an image obtained by extracting only the start block 505. A start block included in the image 503 having a sub-pixel phase shift is indicated by a block 507, and that included in the image 504 is indicated by a block 508.

Figure 6:
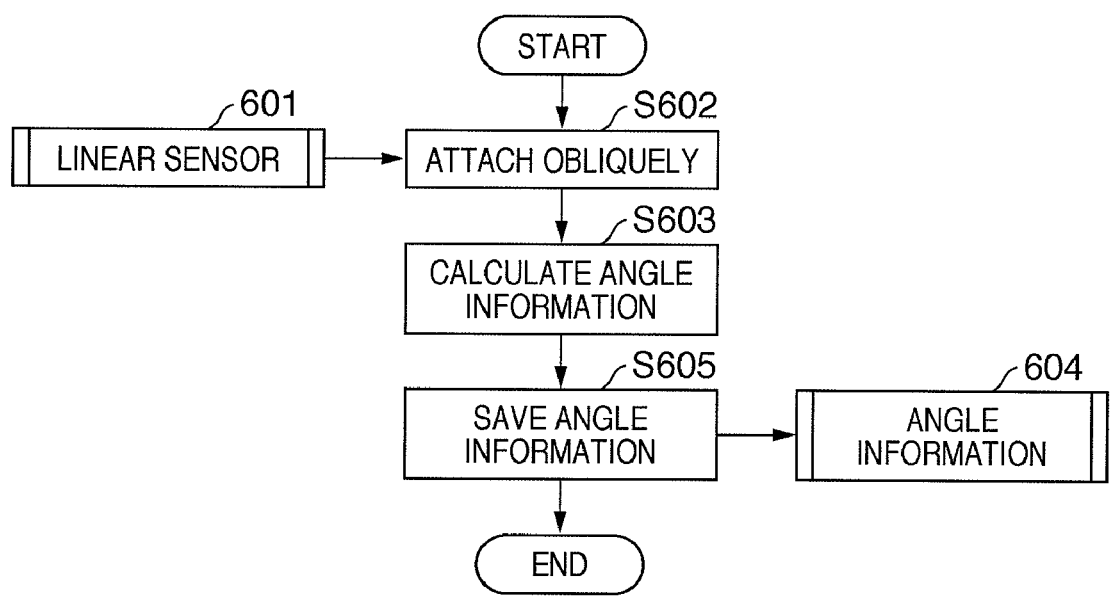
FIG. 6 is a flowchart showing the sequence of processing for obliquely attaching a sensor in the embodiment of the present invention.

FIG. 6 is a flowchart showing the sequence of processing for obliquely attaching a sensor. In step S602, a linear sensor 601 is obliquely attached. This step is manually done using a jig or is automatically done by a machine. In step S603, a tilt angle of the linear sensor is calculated. The angle calculation method is not particularly limited. Conversely, the sensor may be attached to have a predetermined tilt angle. The calculated angle is saved as angle information 604 in step S605. Since the sensor is attached at the time of manufacture of the apparatus, the processing in FIG. 6 is executed prior to the manufacture, and the image sensing device is fixed to the apparatus at the saved angle in the manufacture. Since this angle is used upon correcting a tilt of image data, it is saved in a storage unit of the image processing apparatus.

<Super-Resolution Processing Sequence>

Figure 7:
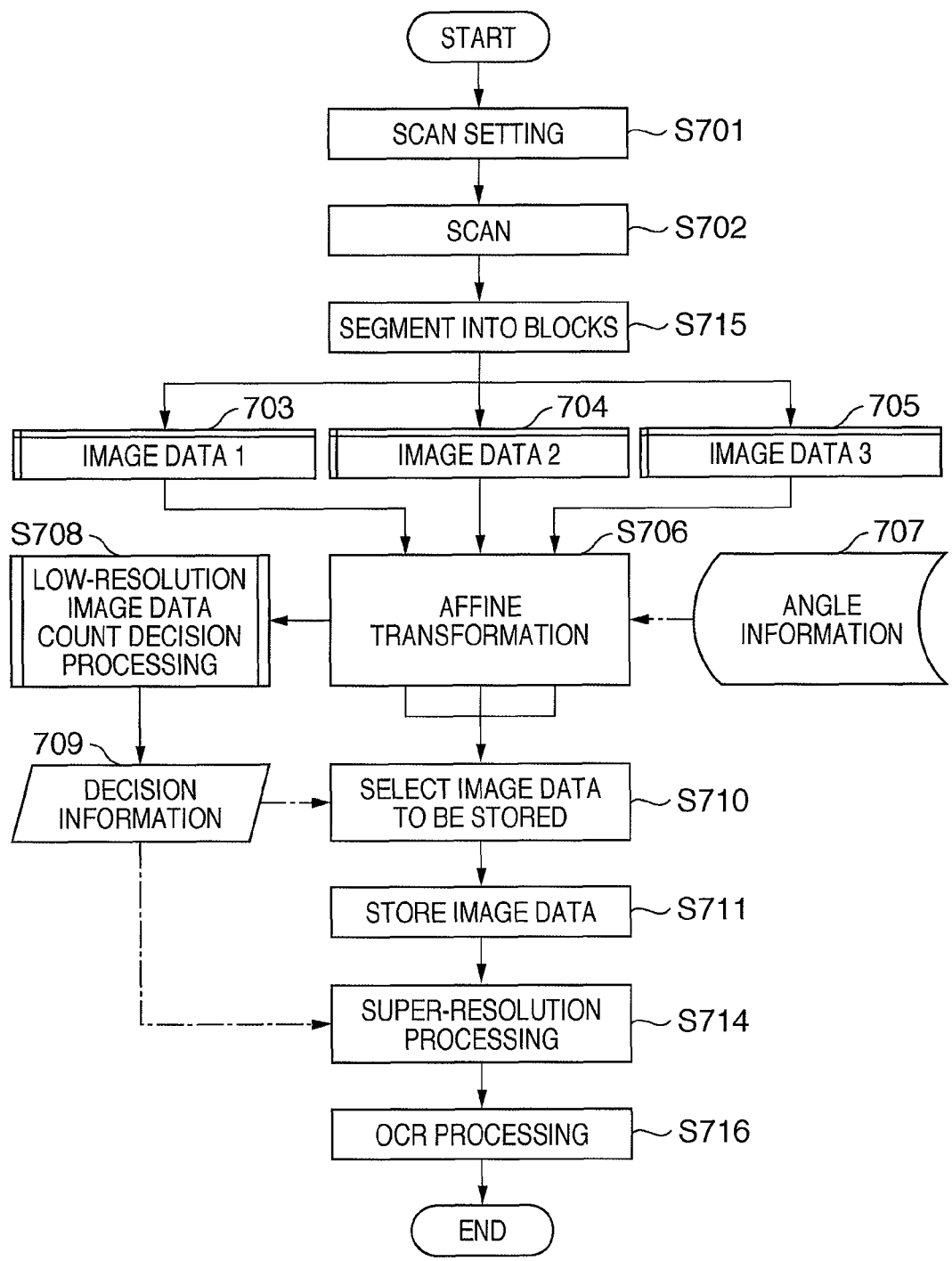
FIG. 7 is a flowchart showing processing according to the embodiment of the present invention.

The sequence of the super-resolution processing using the obliquely attached sensor (to be simply referred to as an oblique sensor hereinafter) will be described below with reference to FIG. 7. In this embodiment, assume that a scan is executed at a resolution of 300 dpi, and an image of 600 dpi is acquired using the super-resolution processing. Of course, the same applies to other resolutions, and low-resolution image data which are to undergo the super-resolution processing may not be those which are read by the oblique sensor. The low-resolution image data can be a plurality of image data which are obtained based on a single image and have phase shifts in a sub-pixel unit. Desirably, the low-resolution image data have the same resolution. Also, it is desirable that the phase shifts are generated in both the main scan direction and sub-scan direction.

In this embodiment, a plurality of input images having phase shifts are obtained using the obliquely attached sensor. However, in an arrangement that inputs a plurality of phase-shift images using a sensor at a normal angle, the same control as in this embodiment can be implemented without applying affine transformation.

In step S701, the user sets a resolution and magnification, and makes various applied settings. When the resolution designated at that time exceeds the capability of the image sensing device, it is interpreted as designation of super-resolution processing, and the super-resolution processing is executed. When the super-resolution processing is not designated, whether or not to execute the super-resolution processing is decided in the subsequent processing in accordance with the contents of an image and, in particular, image features indicating the frequency characteristics. In this case, the latter case, that is, the processing for deciding whether or not to execute the super-resolution processing in accordance with the contents of an image and, in particular, image features indicating the frequency characteristics will be described below.

In step S702, the image reading unit 101 scans a document to obtain low-resolution image data. In step S715, the input low-resolution image data are segmented into blocks. An appropriate block size may be used. However, since each block serves as a processing unit, the block size may be decided in consideration of, for example, a free capacity of the storage unit. For examples when the free capacity is large, a large block size is desirably set; when the free capacity is small, a small block size is desirably set. Note that processing may be executed for a single image without any block segmentation. In this case, step S715 is skipped.

Since this embodiment handles three images having sub-pixel phase shifts, low-resolution image data having phase shifts, which are input by a single scan, are three different image data 703, 704, and 705. In the description of this embodiment, the number of images having phase shifts is three. However, the number of images is not particularly limited.

In step S706, affine transformation is applied using angle information 707 to correct a tilt of each image data. The angle information 707 is the same as the angle information 604 calculated in the sequence of the processing shown in FIG. 6. The method of correcting image data having a tilt is not limited to the affine transformation, and any other methods may be used. By correcting images each having a tilt, image data which have phase shifts in a sub-pixel unit in the main scan direction and sub-scan direction, and in which an image tilt is corrected can be acquired. That is, a plurality of low-resolution image data as sources of the super-resolution processing can be acquired.

In step S708, high-frequency component or character analysis is applied to the tilt-corrected image to decide the low-resolution image data count, thereby generating decision information 709 that designates image data to be used. The image data used as a decision criterion is one low-resolution image data. In this step, the high-frequency component analysis and character analysis are handled as independent processes. However, the character analysis can be considered as one method required to analyze the spatial frequency characteristics of an image. That is, since a character image, in particular, a small character image includes many thin lines, an image including such character images has a high spatial frequency. In particular, a text region locally has a high spatial frequency. For this reason, in place of transformation processing into a frequency domain using, for example, DCT or FFT, a character size distribution or text region is analyzed to approximately detect a spatial frequency and, in particular, an occupation ratio of high-frequency components. Details of the decision processing in step S708 will be described later. The number of image data to be used in the low-resolution image data count determination sequence of a plurality of input images having phase shifts is not particularly limited.

Image data to be used are selected from the image data 703 to 705 according to the decision information 709 in step S710, and are stored in a memory in step S711. In FIG. 7, for example, image data after tilt correction of the image data 703 and 704 are stored.

In step S714, the low-resolution image data stored in the memory in step S711 are read out in accordance with the decision information 709, and the super-resolution processing is executed.

After that, in step S716 the data processing unit 105 executes OCR processing or the like for high-resolution image data obtained by the super-resolution processing.

<Low-Resolution Image Data Count Decision Processing 1>

Figure 8:
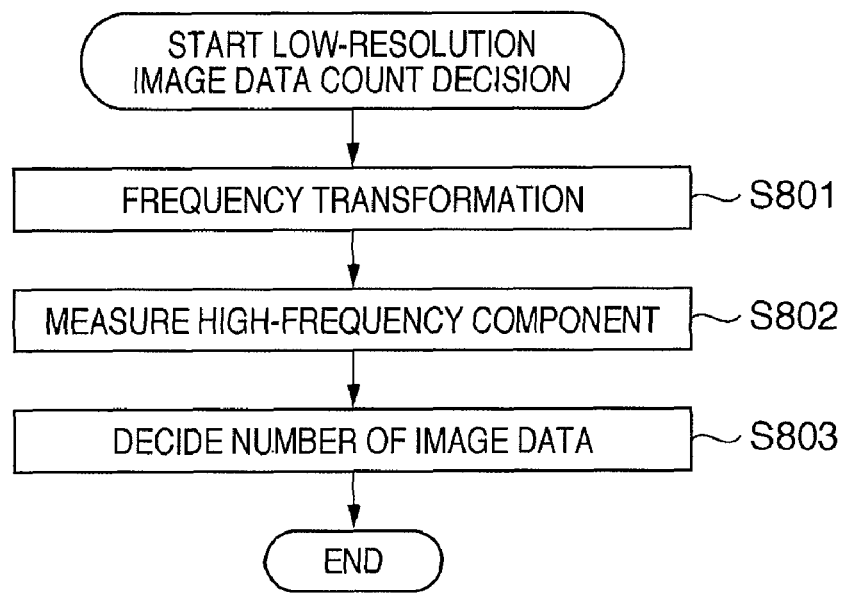
FIG. 8 is a flowchart showing the sequence of low-resolution image data count determination processing using the characteristics of frequency components in the embodiment of the present invention.

The sequence showing the first example of the sequence of the low-resolution image data count decision processing using the frequency component characteristics in step S708 will be described below with reference to FIG. 8.

In step S801, frequency transformation such as DCT or DFT (FFT) is applied to input low-resolution image data. In step S802, an occupation ratio of high-frequency components (e.g., frequency components exceeding a predetermined threshold frequency) to the frequency distribution of the entire image is measured and quantified. In this case, the obtained ratio may be converted into an index value corresponding to that ratio in place of the obtained value intact. In step S803, the number of low-resolution image data used in the super-resolution processing is decided based on the measured value. Note that the number of images is decided based on a decision threshold table exemplified in FIG. 11. That is, the obtained value is applied to the table, and the corresponding number of images is output as the number of low-resolution image data used in the super-resolution processing. When the ratio of frequency components which exceed a reference frequency is equal to or smaller than a given value (e.g., 0), the super-resolution processing may be skipped, and one of the low-resolution image data may be saved or output intact as output image data.

The number of low-resolution image data used in the super-resolution processing can be changed for respective blocks of a low-resolution image. That is, a low-resolution image is segmented into block regions, and frequency components are extracted for respective segmented block regions. For a block region in which the ratio of high-frequency components exceeding the reference frequency is higher than a threshold, the number of low-resolution images is increased; for a block region in which the ratio of high-frequency components is lower than the threshold, the number of low-resolution images is decreased.

In this way, since the number of low-resolution images used in the super-resolution processing is decreased for a low-frequency component region (e.g., a blank region of an image), a time required for the super-resolution processing can be shortened.

According to this first example, as the frequency components of an image are higher, for example, the number of low-resolution image data can be increased stepwise. Consequently, for an image with higher frequency components, high-resolution image data with a higher resolution can be generated. Otherwise, the number of low-resolution image data to be used is decreased to shorten the processing time and to reduce the storage capacity of a memory used to save image data. In addition, since there are many relatively low-frequency components, deterioration of image quality can also be prevented.

<Low-Resolution Image Data Count Decision Processing 2>

Figure 9:
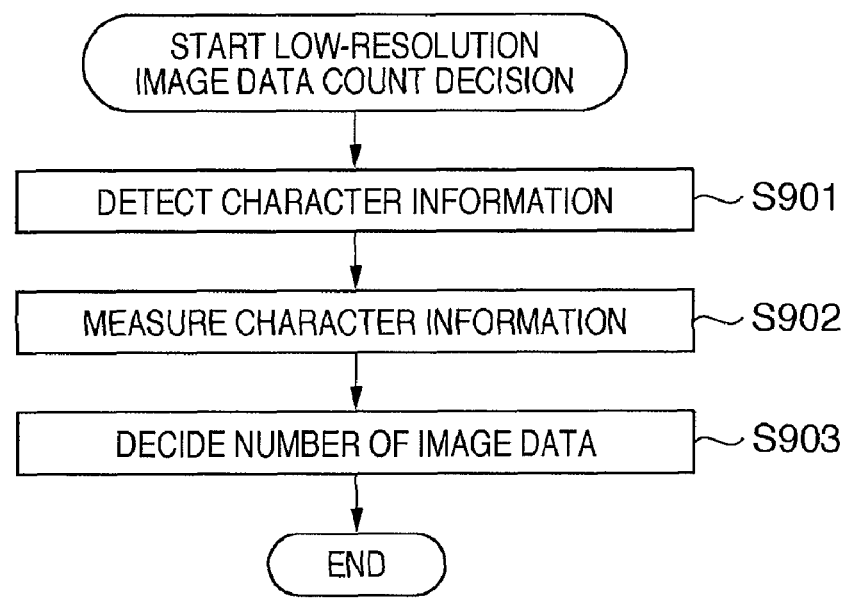
FIG. 9 is a flowchart showing the sequence of low-resolution image data count determination processing using the characteristics of character information in the embodiment of the present invention.

The sequence showing the second example of the sequence of the low-resolution image data count determination processing using the characteristics of character information in step S708 will be described below with reference to FIG. 9.

In step S901, character information detection processing such as block selection and OCR is applied to an input image. In step S902, character related information including character sizes, the number of characters, and the areas of text regions is measured in association with character information, and the measured information is quantified. In a simplest example, block selection processing may be applied to an input image, and the numbers of pixels of regions determined as text regions may be added up for the entire image. A ratio of the number of pixels in the text regions to that of the entire image is converted into an index value, which is used as a quantified value. As another character information measurement method, a determination method upon execution of OCR processing will be described in detail later.

In step S903, the number of image data used in super-resolution processing is decided based on the measured value. Note that the number of image data is decided based on a determination threshold table to be described using FIG. 11. For example, the obtained value is applied to the table, and the corresponding number of image data is output as the number of low-resolution image data used in the super-resolution processing.

According to this second example, as the ratio of characters in the image is higher, for example, the number of low-resolution image data can be increased stepwise as in an image including higher frequency components. Thus, for an image in which the occupation ratio of characters is high, high-resolution image data with a higher resolution can be generated. Otherwise, the number of low-resolution image data to be used is decreased to shorten the processing time and to reduce the storage capacity of a memory used to save image data. In addition, since there are a small number of characters and many relatively low-frequency components, deterioration of image quality can also be prevented.

<Low-Resolution Image Data Count Decision Processing 3>

The sequence showing the third example of the sequence of the low-resolution image data count determination processing using the characteristics of frequency components and character information in step 3708 will be described below with reference to FIG. 10.

In step S1001, frequency transformation such as DCT or DFT (FFT) is applied to an input image. In step S1002, an occupation ratio of high-frequency components to the entire image is measured and quantified. In step S1003, a measurement value is generated by multiplying the measured value by a weight which is automatically determined based on the scan setting set in step S701.

On the other hand, in step S1005 character information detection processing such as block selection and OCR is applied to an input image. In step S1006, information including the number of characters, area, and the like of character information is measured and quantified. In step S1007, a measurement value is generated by multiplying the measured value by a weight (for example, a value obtained by subtracting the weight adapted in step S1003 from 1) which is automatically determined based on the scan setting set in step S701.

In step S1004, the measurement value derived from the high-frequency components in step S1003 and that derived from the character information in step S1007 are added to each other, thus deciding the number of image data used in the super-resolution processing. Note that the number of image data is decided based on a determination threshold table to be described using FIG. 11.

According to this third example, the processing time can be shortened, and the storage capacity of a memory required to save image data can be reduced by combining the first and second examples. In addition, since there are many relatively low-frequency components, deterioration of image quality can also be prevented. Furthermore, when the user varies the weights, he or she can change the characteristic analysis method.

The determination threshold table of the number of images used in the super-resolution processing will be described below with reference to FIG. 11. A table 1101 represents a threshold table stored in the storage unit 102. Based on the scan setting set in step 3701, a table type to be used is selected. In the following description, assume that a setting A 1102 is selected in this case. When the measurement value obtained in step S802 or S902 or added in step S1004 ranges from 0 to 9. a row 1103 is selected to indicate in the setting A that one input image is to be used.

For example, when the user designates a low-resolution setting such as PDF transmission at 100 dpi, since the resolution of even one image which is generated by a reader that handles an image of 300 dpi at lowest exceeds the designated resolution, a table type which always determines one image as in a setting B 1104 shown in FIG. 11 is used. The same as in the setting A applies to a setting C. The user selects one of these settings in advance in, for example, step S701 shown in FIG. 7.

<Low-Resolution Image Data Count Decision Processing 4 (OCR Processing 1)>

Figure 12:
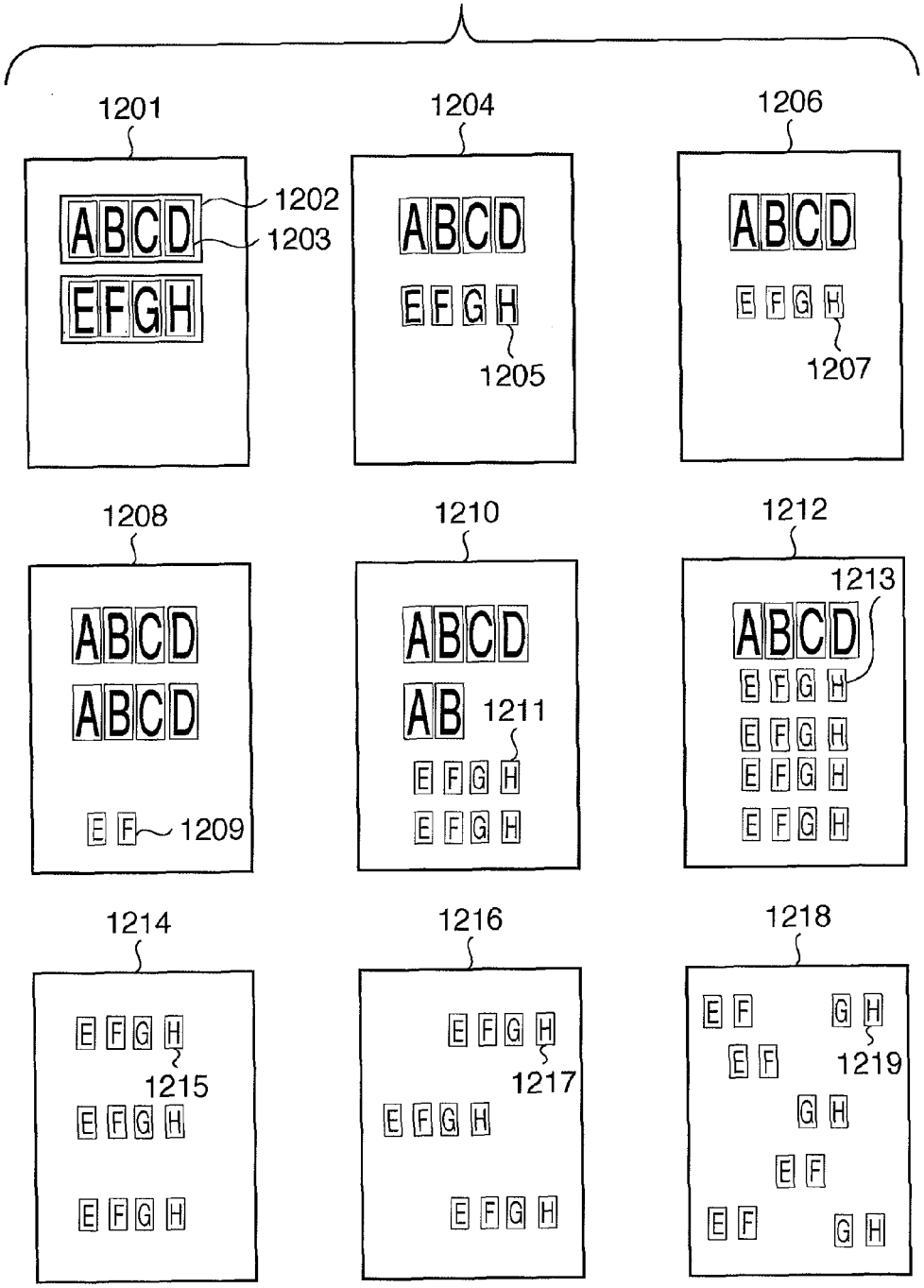
FIG. 12 is a view showing examples of documents upon execution of OCR processing in the embodiment of the present invention.

An embodiment upon execution of OCR processing in the determination method using character information described using FIG. 9 will be described below. Examples of documents upon execution of OCR processing will be described first using FIG. 12. A document 1201 is an example of a document on which a character string 1202 of 18 points is printed. A region 1203 indicates a region occupied by an 18-point character. A document 1204 is an example of a document on which 12-point characters 1205 are printed. A document 1206 is an example of a document on which 8-point characters 1207 are printed. A document 1208 is an example of a document on which the occupation ratio of 8-point characters 1209 to the entire image is low. A document 1210 is an example of a document on which the occupation ratio of 8-point characters 1211 to the entire image is relatively high. A document 1212 is an example of a document on which the occupation ratio of 8-point characters 1213 to the entire image is high. A document 1214 is an example of a document on which 8-point characters 1215 are printed to have a simple layout.

A document 1216 is an example of a document on which 8-point characters 1217 are printed to have a relatively complicated layout. A document 1218 is an example of a document on which 8-point characters 1219 are printed to have a complicated layout.

Figure 13:
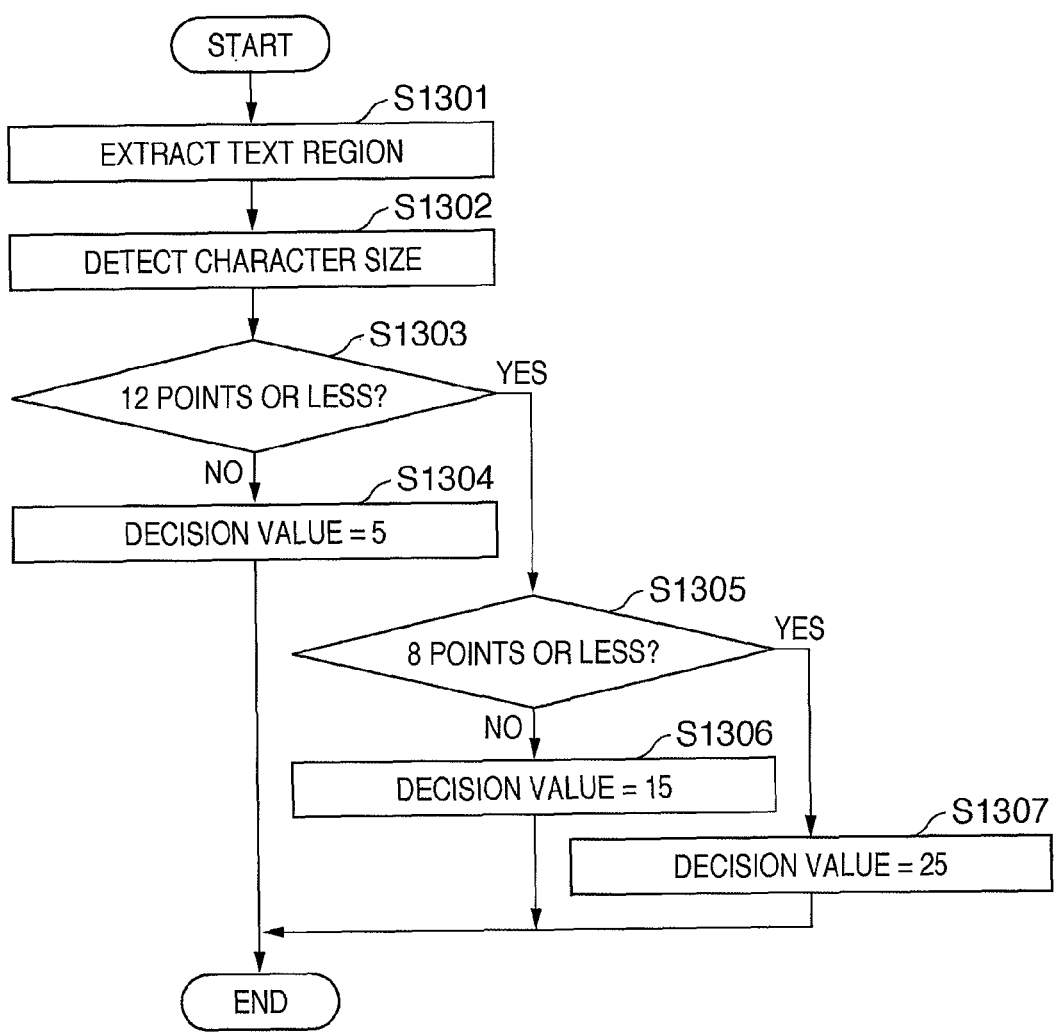
FIG. 13 is a flowchart showing an example of a low-resolution image data count determination method using point values of characters included in a document upon execution of OCR processing in the embodiment of the present invention.

An example of a low-resolution image data count determination method using point values of characters included in documents upon execution of OCR processing will be described below with reference to FIG. 13. In step S1301, a text region is detected from an input image. Step S1301 is the process which is also executed in the conventional character recognition. In step S1302, the sizes of characters included in that region are detected. If it is determined in step S1303 that the smallest detected character size is larger than a first reference size (e.g., 12 points), it is determined that no problem is posed when the number of low-resolution images to be used in the super-resolution processing is small, and the process advances to step S1304. In an example of this embodiment, a decision value "5" is set. This is an example of the value associated with FIG. 11.

On the other hand, if it is determined in step S1303 that the smallest size is equal to or smaller than the first reference size (e.g., 12 points), the process advances to step S1305. If it is determined in step S1305 that the smallest character size is larger than a second reference size (e.g., 8 points) smaller than the first reference size, it is determined that no problem is posed when the number of low-resolution images to be used in the super-resolution processing is relatively small, and the process advances to step S1306. In an example of this embodiment, a decision value "15" is set.

If it is determined in step S1305 that the smallest size is equal to or smaller than the second reference size (e.g., 8 points), the process advances to step S1307. In this case, since the document includes many small-point characters, the super-resolution processing uses as many low-resolution images as possible. Hence, in an example of this embodiment, a decision value "25" is set.

According to this method, the number of low-resolution data can be changed stepwise according to the character size in a document image. For this reason, an image which includes small characters to be printed at a higher resolution can be converted into a high-resolution image using more low-resolution image data. Conversely, for an image which has a low necessity of high-resolution conversion and does not include small characters, the number of low-resolution image data to be used is reduced, thus realizing speeding-up of processing and memory savings.

<Low-Resolution Image Data Count Decision Processing 5 (OCR Processing 2)>

Figure 14:
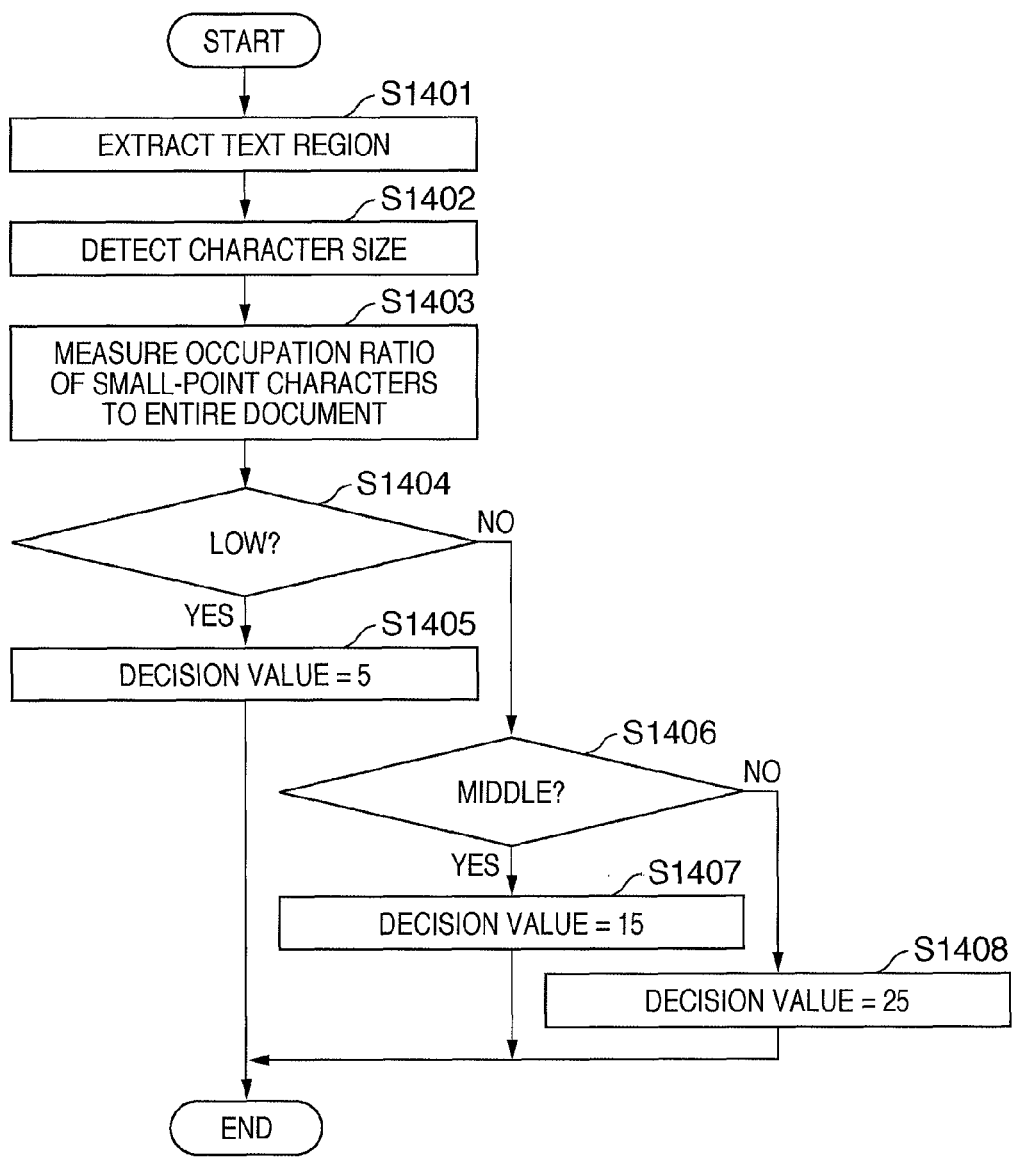
FIG. 14 is a flowchart showing an example of a low-resolution image data count determination method using an occupation ratio of small-point characters included in a document to the entire document upon execution of OCR processing in the embodiment of the present invention.

An example of a low-resolution image data count determination method which uses an occupation ratio of small-point characters included in a document to the entire document upon execution of OCR processing will be described below with reference to FIG. 14. A text region is detected from an input image in step S1401, and sizes of characters are detected in step S1402. In step S1403, the occupation ratio of small-point characters (e.g., characters equal to or smaller than a reference size) of the detected characters to the entire document image is measured. If it is determined in step S1404 that the ratio of the detected small-point characters is smaller than a first reference value, it is determined that no problem is posed when the number of low-resolution images to be used in the super-resolution processing is small, and the process advances to step S1405. In an example of this embodiment, a decision value "5" is set.

If it is determined in step S1404 that the ratio of the detected small-point characters is equal to or larger than the first reference value, the process advances to step S1406. If it is determined in step S1406 that the ratio of the detected small-point characters is smaller than a second reference value, it is determined that no problem is posed when the number of low-resolution images to be used in the super-resolution processing is relatively small, and the process advances to step S1407. In an example of this embodiment, a decision value "15" is set.

If it is determined in step S1406 that the ratio of the detected small-point characters is equal to or larger than the second reference value, the process advances to step S1408. In this case, since the document includes many small-point characters, the super-resolution processing uses as many low-resolution images as possible. Hence, in an example of this embodiment, a decision value "25" is set.

According to this method, the number of low-resolution data can be changed stepwise according to the occupation ratio of small- or middle-size characters in a document image. For this reason, an image in which the ratio of small characters to be printed at a higher-resolution is higher can be converted into a high-resolution image using more low-resolution image data. Conversely, for an image which has a low necessity of high resolution conversion and in which the ratio of small characters is lower, the number of low-resolution image data to be used is reduced, thus realizing speeding-up of processing and memory savings.

<Low-Resolution Image Data Count Decision Processing 6 (OCR Processing 3)>

Figure 15:
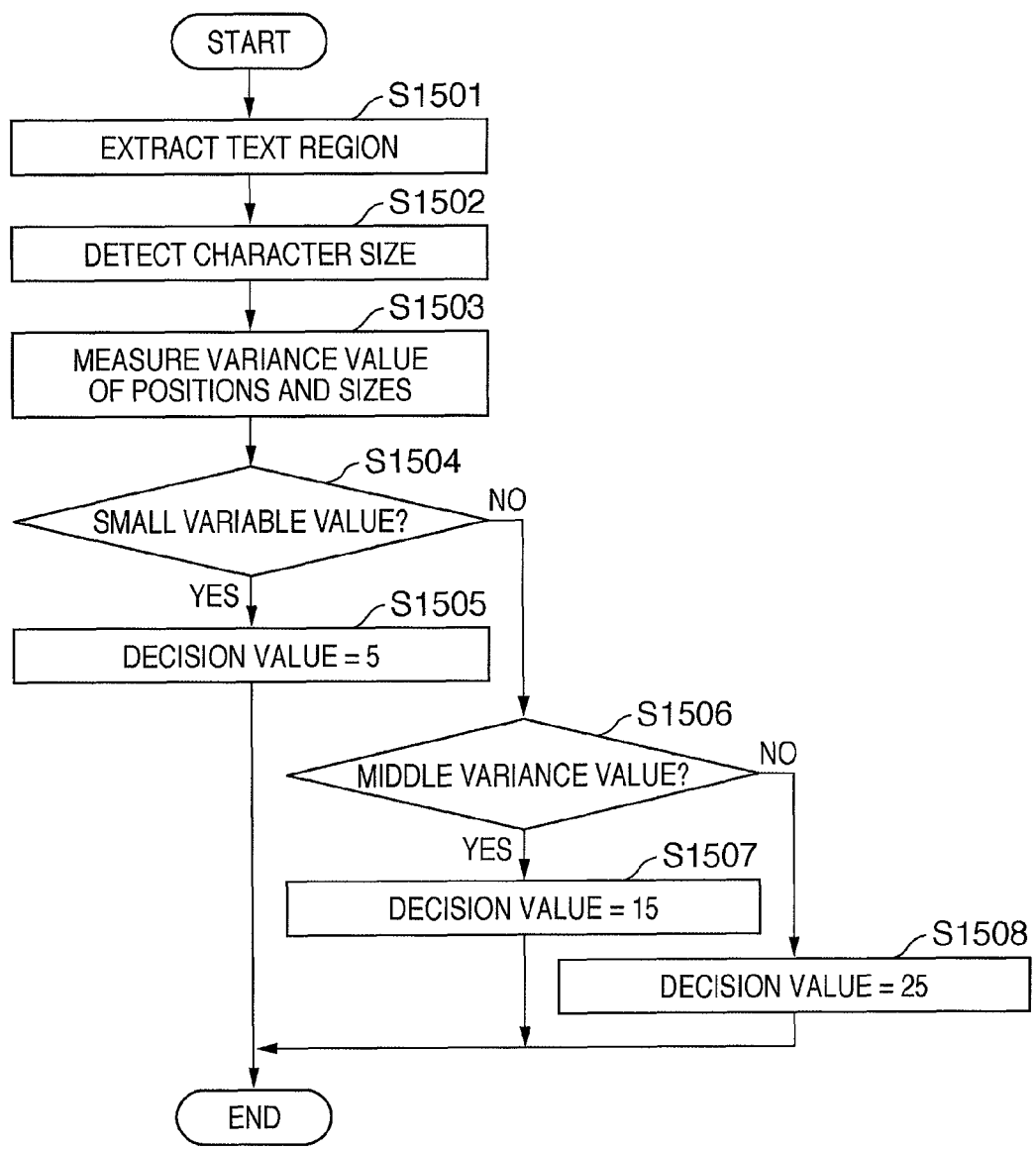
FIG. 15 is a flowchart showing an example of a low-resolution image data count determination method using the complexity of a layout of characters included in a document upon execution of OCR processing in the embodiment of the present invention.

An example of a low-resolution image data count determination method using the complexity of a layout of characters included in a document upon execution of OCR processing in the embodiment of the present invention will be described below with reference to FIG. 15. A text region is detected from an input image in step S1501, and sizes of characters in a document are detected in step S1502. In step S1503, the detected characters are grouped for respective character sizes based on the positions and size information of the detected characters to measure a variance of the character sizes. If it is determined in step S1504 that the detected variance value is smaller than a first reference value, it is determined that no problem is posed when the number of low-resolution images to be used in the super-resolution processing is small, and the process advances to step S1505. In an example of this embodiment, a decision value "5" is set.

If it is determined in step S1504 that the detected variance value is not smaller than the first reference value, the process advances to step S1506. If it is determined in step S1506 that the detected variance value is smaller than a second reference value larger than the first reference value, it is determined that no problem is posed when the number of low-resolution images to be used in the super-resolution processing is relatively small, and the process advances to step S1507. In an example of this embodiment, a decision value "15" is set.

If it is determined in step S1506 that the detected variance value is equal to or larger than the second reference value, the process advances to step S1508. In this case, it is determined that a document has a complicated layout, and the super-resolution processing uses as many low-resolution images as possible. Hence, in an example of this embodiment, a decision value "25" is set.

In this way, the number of low-resolution image data to be used can be changed stepwise according to the variance of respective character sizes.

<Generation of High-Resolution Image Data>

The affine transformation processing in step S706 and the super-resolution processing in step S714 in FIG. 7 will be described below with reference to FIGS. 20 and 21. Note that low-resolution image data to be processed are images F0 to F3 shown on the left side in FIG. 20. Assume that these low-resolution image data have already been acquired.

The tilt angle θ of the image sensing device 1613 is held in a storage area in the MFP as a value unique to the MFP which mounts the image sensing device 1613. In step S706, the affine transformation is executed using this angle information to rotate the acquired image data having a tilt, that is, to compensate for that image data to reduce the tilt with respect to the scan direction, thereby correcting the tilt of the image data.

Let (X, Y) be the coordinates before transformation, (X', Y') be the coordinates after transformation, and θ be the rotation angle (the tilt angle of the area sensor in this embodiment). Then, image data in which a tilt is corrected can be obtained by the affine transformation processing given by:

$$[X', Y', 1] = [X, Y, 1] \begin{vmatrix} \cos\theta & \sin\theta & 0 \\ -\sin\theta & \cos\theta & 0 \\ 0 & 0 & 1 \end{vmatrix} \quad (1)$$

where X and Y are the coordinates of a pixel before transformation, and X' and Y' are those after transformation.

The image data obtained by the affine transformation is low-resolution image data in which a tilt is corrected. Note that the tilt correction method is not limited to the affine transformation, and any other methods may be used as long as a tilt of image data can be corrected.

Then, the super-resolution processing is executed using a plurality of low-resolution image data in each of which a tilt is corrected.

The super-resolution processing executed in this case will be described in detail below with reference to FIGS. 20 and 21. FIG. 20 is a view showing low-resolution image data used in the super-resolution processing and high-resolution image data after the super-resolution processing. FIG. 20 shows a document, and reference low-resolution image data F0 and target low-resolution image data F1 to F3, which are obtained by reading the document by the area sensor. A dotted line rectangle that bounds the document indicates a region when the reference low-resolution image data F0 is read by the area sensor, and sold line rectangles indicate regions when the target low-resolution image data F1 to F3 are read by the area sensor.

Figure 20:
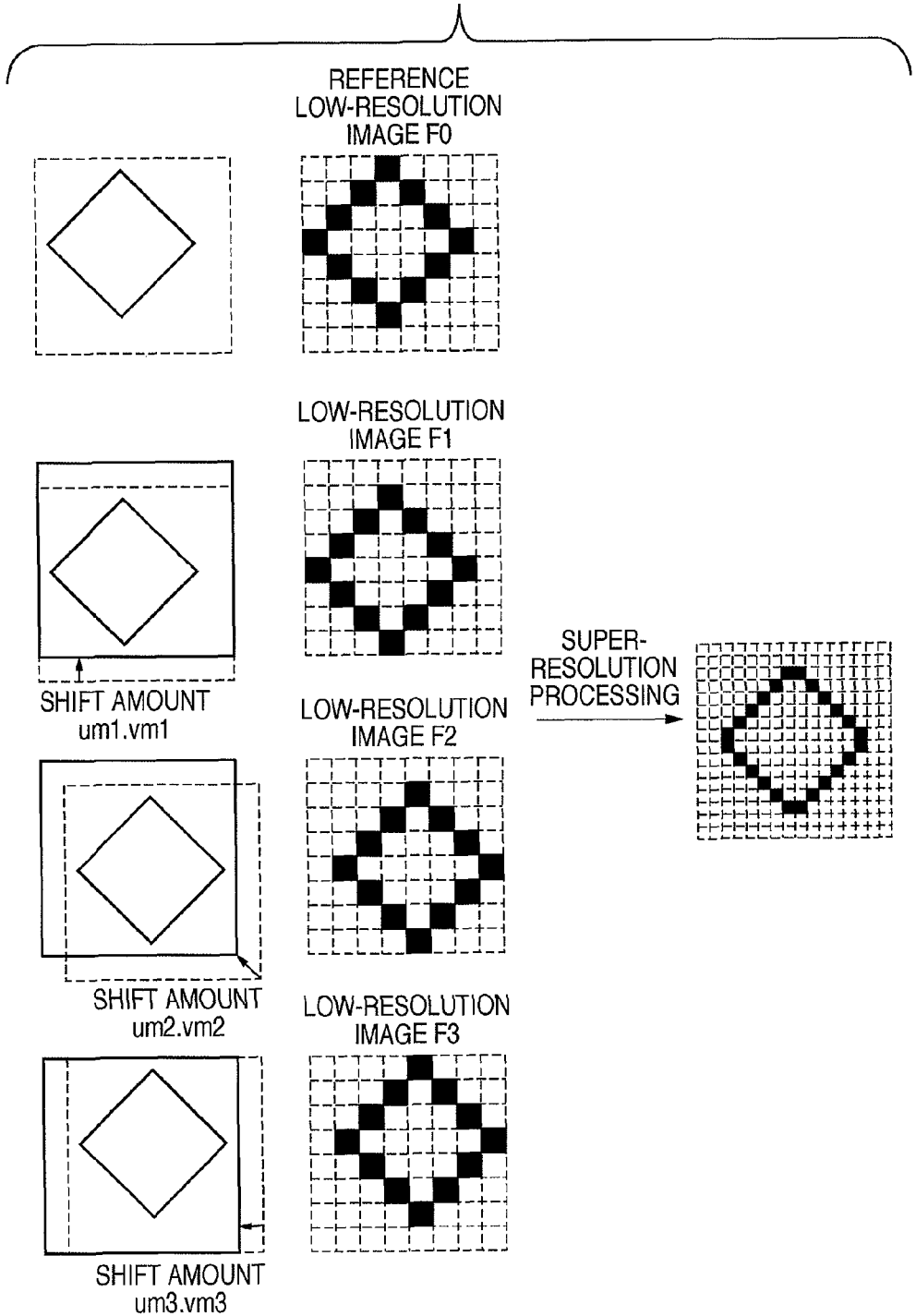
FIG. 20 is a view showing an example of super-resolution processing.
Figure 21:
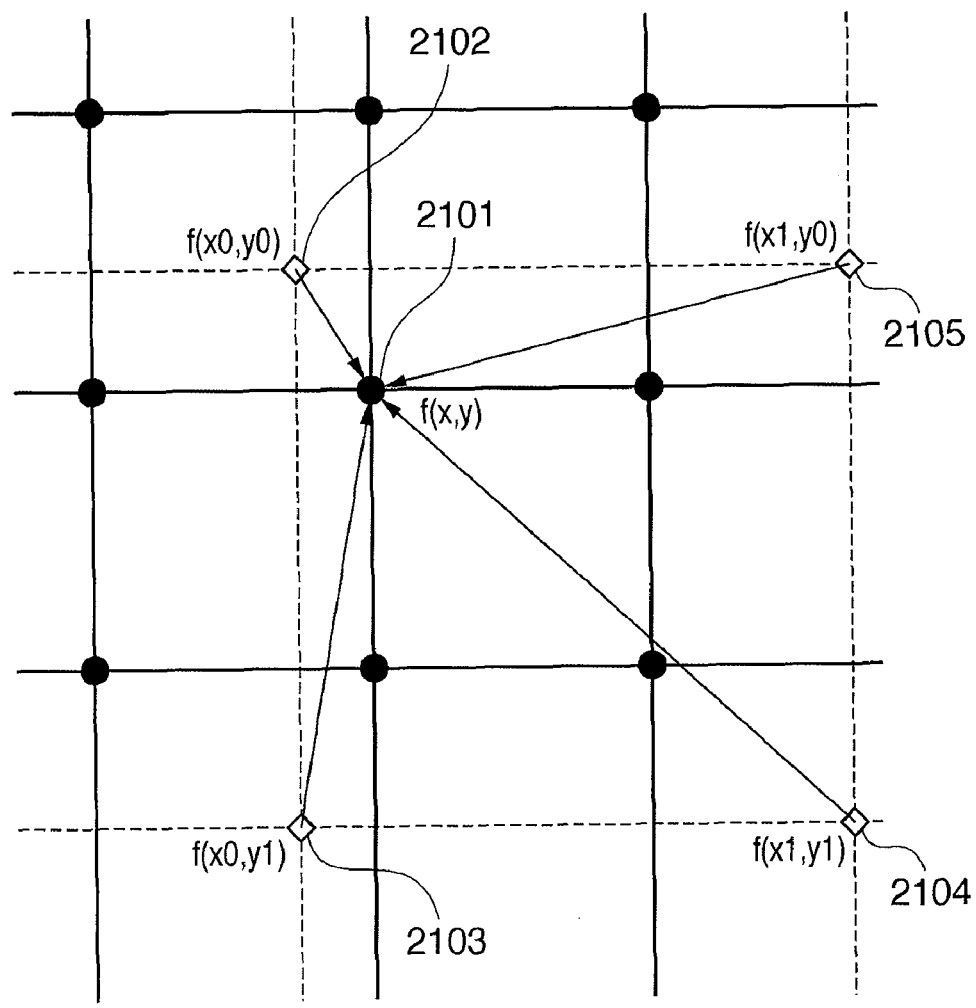
FIG. 21 is a view showing an example of super-resolution processing.

In this embodiment, the respective target low-resolution images have shifts in a one-pixel unit for the sake of simplicity in FIG. 20. However, in reading of an actual area sensor, phase shifts less than one pixel are generated in the main scan direction and sub-scan direction. Using such minute shifts, the super-resolution processing can be implemented.

Pixels (to be referred to as "generation pixels" hereinafter) which form the high-resolution image data to be generated include those which do not exist on any of the reference low-resolution image and target low-resolution images.

For these pixels, predetermined interpolation processing is executed using pixel data that represent pixel values of pixels around these generation pixels, thus implementing resolution enhancement while executing synthesis. In this case, the interpolation processing such as a bilinear method, bicubic method, and nearest neighbor method can be used. FIG. 21 shows that example.

For example, when the interpolation processing based on the bilinear method is used, a nearest neighbor pixel 2102 having a closest distance from the position of a generation pixel 2101 is extracted from the reference low-resolution image and target low-resolution image data. Then, four pixels which surround the generation pixel position are decided as surrounding pixels 2102 to 2105 from the target low-resolution image shown in FIG. 21, and values obtained by adding a predetermined weight to data values of the surrounding pixels are averaged to obtain a data value of the generation pixel using:

$$f(x, y)=[|x1-x|\{|y1-y|f(x0, y0)+|y-y0|f(x0, y1)\}+|x-x0|\{|y1-y|f(x, y0)+|y-y0|5(x1, y1)\}]/|x1-x0||y1-y0|$$

By repeating the aforementioned processing for respective generation pixel positions, for example, a super-resolution image having a 2× resolution shown in FIG. 20 can be obtained. Note that the resolution is not limited to 2×, but various other magnifications may be used. As the number of data values of a plurality of low-resolution images used in the interpolation processing increases, a super-resolution image having a higher resolution can be obtained.

Furthermore, the super-resolution processing can be executed for respective blocks which form each image. Also, the number of low-resolution image data may be decided for respective blocks. Note that the present invention may be applied to either a system constituted by a plurality of devices (e.g., a host computer, interface device, reader, and printer), or an apparatus consisting of a single device (e.g., a copying machine or facsimile apparatus). The object of the present invention is also achieved when a storage medium which stores a program that implements the functions of the aforementioned embodiments is supplied to a system or apparatus, and a computer of the system or apparatus reads out and executes the program stored in the storage medium. In this case, the program itself read out from the storage medium implements the functions of the aforementioned embodiments, and the program itself and the storage medium that stores the program constitute the present invention.

The present invention also includes a case in which an operating system (OS) or the like, which runs on a computer, executes some or all of actual processes based on an instruction of the program, and the functions of the aforementioned embodiments are implemented by these processes. Furthermore, the present invention is applied to a case in which the program read out from the storage medium is written in a memory equipped on a function expansion card or unit, which is inserted in or connected to the computer. In this case, a CPU or the like equipped on the function expansion card or unit executes some or all of actual processes based on the instruction of the written program, and the functions of the aforementioned embodiments are implemented by these processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-179463. filed Jul. 9, 2008. which is hereby incorporated by reference herein in its entirety.

What is claimed is:

1. An image processing apparatus, which is configured to execute super-resolution processing for generating high-resolution image data having a high resolution by synthesizing low-resolution image data, said apparatus comprising:
a decision unit configured to decide a number of low-resolution image data to be used in accordance with frequency characteristics included in the low-resolution image data; and
a super-resolution processing unit configured to generate a high-resolution image by synthesizing low-resolution image data which are as many as the number of data decided by said decision unit, are obtained from an identical image, and have phase shifts from each other.

2. The apparatus according to claim 1, wherein the low-resolution image data is segmented into block regions, frequency components are extracted from respective segmented block regions, and the number of low-resolution image data to be used for a block region in which a ratio of high-frequency components that exceed a reference frequency to a frequency distribution of an entire image is higher than a threshold is set to be larger than the number of low-resolution image data to be used for a block region in which the ratio of high-frequency components is lower than the threshold.

3. The apparatus according to claim 1, wherein said decision unit measures a ratio of high-frequency components that exceed a reference frequency to a frequency distribution of an entire image in frequency components included in the low-resolution image data, and decides the number of low-resolution image data to be used using the ratio of high-frequency components as the frequency characteristics.

4. The apparatus according to claim 1, wherein said decision unit detects character images included in the low-resolution image data, and decides the number of low-resolution image data to be used using a size of the detected character images as the frequency characteristics.

5. The apparatus according to claim 1, wherein said decision unit measures a ratio of high-frequency components that exceed a reference frequency to a frequency distribution of an entire image in frequency components included in the low-resolution image data, detects character images included in the low-resolution image data, and decides the number of low-resolution image data to be used using the ratio of high-frequency components and a size of the detected character images as the frequency characteristics.

6. The apparatus according to claim 1, wherein said super-resolution processing unit executes super-resolution processing for respective blocks which form an image.

7. The apparatus according to claim 3, wherein said decision unit decides the number of low-resolution image data to be used so as to increase the number of low-resolution image data stepwise as the ratio of high-frequency components that exceed the reference frequency becomes higher.

8. The apparatus according to claim 4, wherein said decision unit decides the number of low-resolution image data to be used so as to increase the number of low-resolution image data stepwise as an occupation ratio of characters not more than a reference size of sizes to an image size becomes higher.

9. The apparatus according to claim 4, wherein said decision unit decides the number of low-resolution image data to be used so as to increase the number of low-resolution image data stepwise as a variance value of sizes of the character images becomes larger.

10. An image processing apparatus, which is configured to execute super-resolution processing for generating high-resolution image data having a high resolution by synthesizing low-resolution image data, said apparatus comprising:
a decision unit configured to decide whether or not to execute super-resolution processing in accordance with frequency characteristics included in the low-resolution image data;
a super-resolution processing unit configured to generate a high-resolution image by synthesizing a plurality of low-resolution image data, which are obtained from an identical image and have phase shifts from each other, when said decision unit decides to execute the super-resolution processing; and
an output unit configured to save or outputs the high-resolution image data generated by said super-resolution processing unit when said decision unit decides to execute the super-resolution processing, and saves or outputs the low-resolution image data when said decision unit decides not to execute the super-resolution processing.

11. The apparatus according to claim 10, wherein said decision unit measures a ratio of high-frequency components that exceed a reference frequency to a frequency distribution of an entire image in frequency components included in the low-resolution image data, and decides to execute the super-resolution processing when the ratio of high-frequency components that exceed the reference frequency exceeds a threshold.

12. The apparatus according to claim 10, wherein said decision unit detects character images included in the low-resolution image data, and decides to execute the super-resolution processing when a smallest size of sizes of the detected character images is not more than a reference size.

13. An image processing method by an image processing apparatus, which is configured to execute super-resolution processing for generating high-resolution image data having a high resolution by synthesizing low-resolution image data, the method comprising:
a decision step of deciding a number of low-resolution image data to be used in accordance with frequency characteristics included in the low-resolution image data; and
a super-resolution processing step of generating a high-resolution image by synthesizing low-resolution image data which are as many as the number of data decided in the decision step, are obtained from an identical image, and have phase shifts from each other.

14. An image processing method by an image processing apparatus, which is configured to execute super-resolution processing for generating high-resolution image data having a high resolution by synthesizing low-resolution image data, the method comprising:
a decision step of deciding whether or not to execute super-resolution processing in accordance with frequency characteristics included in the low-resolution image data;
a super-resolution processing step of generating a high-resolution image by synthesizing a plurality of low-resolution image data, which are obtained from an identical image and have phase shifts from each other, when it is decided in the decision step to execute the super-resolution processing; and
an output step of saving or outputting the high-resolution image data generated in the super-resolution processing step when it is decided in the decision step to execute the super-resolution processing, and saving or outputting the low-resolution image data when it is decided in the decision step not to execute the super-resolution processing.

15. A non-transitory computer-readable storage medium, which stores a program for executing super-resolution processing for generating high-resolution image data having a high resolution by synthesizing low-resolution image data, the program making the computer execute:
a decision step of deciding whether or not to execute super-resolution processing in accordance with frequency characteristics included in the low-resolution image data;
a super-resolution processing step of generating a high-resolution image by synthesizing a plurality of low-resolution image data, which are obtained from an identical image and have phase shifts from each other, when it is decided in the decision step to execute the super-resolution processing; and
an output step of saving or outputting the high-resolution image data generated in the super-resolution processing step when it is decided in the decision step to execute the super-resolution processing, and saving or outputting the low-resolution image data when it is decided in the decision step not to execute the super-resolution processing.

16. A non-transitory computer-readable storage medium, which stores a program for executing super-resolution processing for generating high-resolution image data having a high resolution by synthesizing low-resolution image data, the program making the computer execute:
a decision step of deciding a number of low-resolution image data to be used in accordance with frequency characteristics included in the low-resolution image data; and
a super-resolution processing step of generating a high-resolution image by synthesizing low-resolution image data which are as many as the number of data decided in the decision step, are obtained from an identical image, and have phase shifts from each other.

* * * * *